United States Patent
Arai et al.

(10) Patent No.: US 11,901,714 B2
(45) Date of Patent: Feb. 13, 2024

(54) WIRING MEMBER

(71) Applicant: Sumitomo Wiring Systems, Ltd., Mie (JP)

(72) Inventors: Kenta Arai, Mie (JP); Daisuke Ebata, Mie (JP); Ryusuke Kudo, Mie (JP); Masaki Mizushita, Mie (JP); Tetsuya Nishimura, Mie (JP); Haruka Nakano, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/776,102

(22) PCT Filed: Nov. 17, 2020

(86) PCT No.: PCT/JP2020/042785
§ 371 (c)(1),
(2) Date: May 11, 2022

(87) PCT Pub. No.: WO2021/100700
PCT Pub. Date: May 27, 2021

(65) Prior Publication Data
US 2022/0385050 A1    Dec. 1, 2022

(30) Foreign Application Priority Data

Nov. 20, 2019 (JP) .................................. 2019-209811

(51) Int. Cl.
*H02G 3/04* (2006.01)
*H01B 7/08* (2006.01)

(52) U.S. Cl.
CPC ............ *H02G 3/0462* (2013.01); *H01B 7/08* (2013.01)

(58) Field of Classification Search
CPC ...... H01B 7/08; H01B 7/0838; H01B 7/0045; H01B 7/0846; H01B 13/01263;
(Continued)

(56) References Cited

U.S. PATENT DOCUMENTS 3,582,030 A  *  6/1971  Barrett, Jr.  ............. H01M 50/00
                                                   248/74.1
3,733,428 A  *  5/1973  Fry  ....................... H01B 7/0846
                                                   156/290
(Continued)

FOREIGN PATENT DOCUMENTS

JP     2015-95984     5/2015
JP     2018-137208    8/2018
(Continued)

OTHER PUBLICATIONS

Office Action issued in Corresponding JP Patent Application No. 2019-209811, dated Feb. 28, 2023, along with an English translation thereof.
(Continued)

*Primary Examiner* — Paresh Paghadal
(74) *Attorney, Agent, or Firm* — Greenblum & Bernstein, P.L.C.

(57) ABSTRACT

A wiring member includes: a first wire like transmission member; a second wire like transmission member that is more easily bent and deformed than the first wire like transmission member; and a base member to which the first wire like transmission member and the second wire like transmission member are fixed, in which the first wire like transmission member is fixed to the base member through a plurality of first fixing parts, the second wire like transmission member is fixed to the base member through a plurality of second fixing parts, the plurality of first fixing parts are aligned at a first interval in a direction along the first wire like transmission member, and the plurality of second fixing (Continued)

parts are aligned at a second interval smaller than the first interval in a direction along the second wire like transmission member.

4 Claims, 4 Drawing Sheets

(58) Field of Classification Search
CPC ............ H01B 13/1272; B60R 16/0215; H02G 3/0418; H02G 3/0456; H02G 3/32
See application file for complete search history.

(56) References Cited

U.S. PATENT DOCUMENTS

| | | | | |
|---|---|---|---|---|
| 4,874,908 A | * | 10/1989 | Johansson | H02B 1/202 439/402 |
| 5,502,287 A | * | 3/1996 | Nguyen | H01B 7/188 174/117 A |
| 5,695,158 A | * | 12/1997 | Boucot | H02G 3/0456 174/72 A |
| 2005/0068250 A1 | * | 3/2005 | Cornec | H02G 3/32 343/702 |
| 2018/0350486 A1 | * | 12/2018 | Egami | H01B 13/01209 |
| 2019/0392963 A1 | | 12/2019 | Ishida et al. | |

FOREIGN PATENT DOCUMENTS

| | | |
|---|---|---|
| JP | 6590134 | 10/2019 |
| WO | 2019/021886 | 1/2019 |

OTHER PUBLICATIONS

International Search Report issued in International Pat. Appl. No. PCT/JP2020/042785, dated Jan. 12, 2021, along with an English translation thereof.

International Preliminary Report on Patentability issued in International Pat. Appl. No. PCT/JP2020/042785, dated Jun. 2, 2022, along with an English translation thereof.

* cited by examiner

F I G. 1
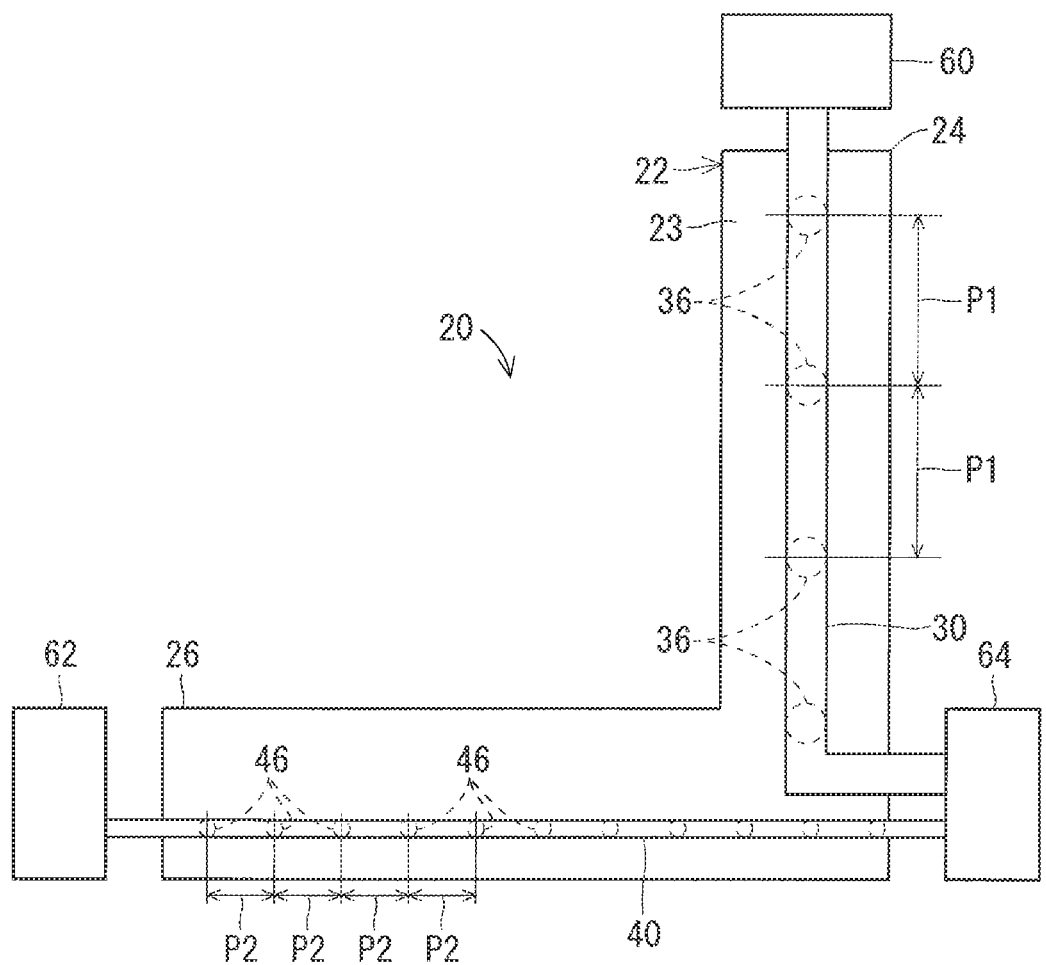

WIRING MEMBER

TECHNICAL FIELD

The present disclosure relates to a wiring member.

BACKGROUND ART

Patent Document 1 discloses a wire harness including a functional exterior member formed in a sheet shape and an electric wire arranged so as to overlap the functional exterior member in at least a part of a region along a longitudinal direction, in which at least a part of a portion where an insulating coating of the electric wire overlaps the functional exterior member is welded. Patent Document 1 discloses an example in which the electric wire and the functional exterior member are intermittently and ultrasonically welded at a constant interval along the longitudinal direction of the electric wire.

PRIOR ART DOCUMENT

Patent Document

Patent Document 1: Japanese Patent Application Laid-Open No. 2018-137208

SUMMARY

Problem to be Solved by the Invention

Here, it is desired that a wire like transmission member can be easily fixed tai a base member.

In view of the above, it is an object of the present disclosure to allow the wire like transmission member to be easily fixed to the base member.

Means to Solve the Problem

A wiring member according to the present disclosure includes: a first wire like transmission member; a second wire like transmission member that is more easily bent and deformed than the first wire like transmission member; and a base member to which the first wire like transmission member and the second wire like transmission member are fixed, in which the first wire like transmission member is fixed to the base member through a plurality of first fixing parts, the second wire like transmission member is fixed to the base member through a plurality of second fixing parts, the plurality of first fixing parts are aligned at a first interval in a direction along the first wire like transmission member, and the plurality of second fixing parts are aligned at a second interval smaller than the first interval in a direction along the second wire like transmission member.

Effects of the Invention

According to the present disclosure, the wire like transmission member is easily fixed to the base member.

BRIEF DESCRIPTION OF DRAWINGS

FIG. 1 is a view illustrating a wiring member according to a first embodiment.

DESCRIPTION OF EMBODIMENTS

Figure 2:
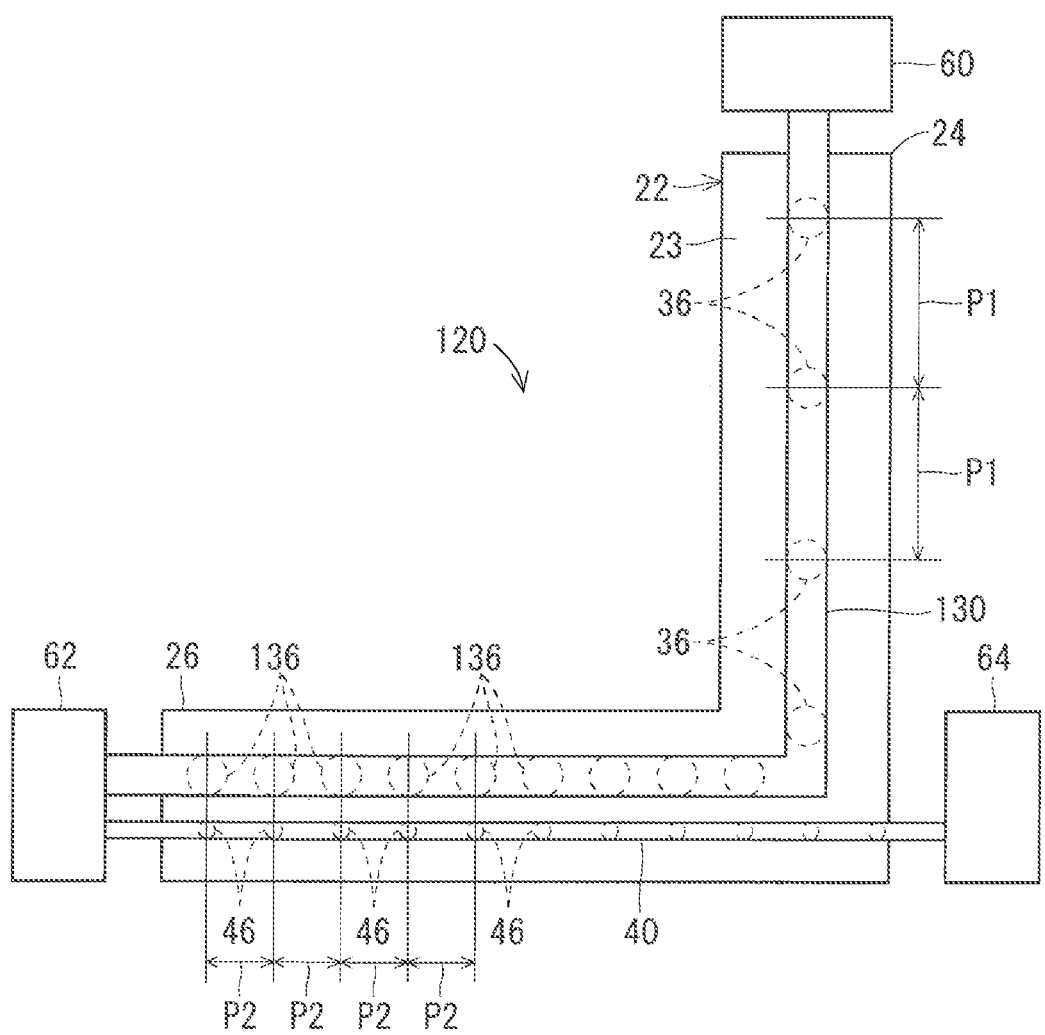
FIG. 2 is a view illustrating a wiring member according to a second embodiment.

Description of Embodiments of the Present Disclosure

First, embodiments of the present disclosure are listed and described.

A wiring member of the present disclosure is described as follows.

(1) A wiring member including: a first wire like transmission member; a second wire like transmission member that is more easily bent and deformed than the first wire like transmission member; and a base member to which the first wire like transmission member and the second wire like transmission member are fixed, in which the first wire like transmission member is fixed to the base member through a plurality of first fixing parts, the second wire like transmission member is fixed to the base member through a plurality of second fixing parts, the plurality of first fixing parts are aligned at a first interval in a direction along the first wire like transmission member, and the plurality of second fixing parts are aligned at a second interval smaller than the first interval in a direction along the second wire like transmission member.

According to the present disclosure, the first wire like transmission member is fixed to the base member through the plurality of first fixing parts aligned at the first interval larger than the second interval. Because the first wire like transmission member is less easily bent and deformed than the second wire like transmission member, the first wire like transmission member is less likely to flutter on the base member. Therefore, the number of fixing positions for the first wire like transmission member can be reduced while the fluttering is suppressed. On the other hand, the second wire like transmission member is more easily bent and deformed than the first wire like transmission member. The second wire like transmission member is fixed to the base member through the plurality of second fixing parts aligned at the second interval smaller than the first interval. This makes the second wire like transmission member not flutter easily on the base member. Therefore, as the entire wiring member, the first wire like transmission member and the second wire like transmission member are fixed to the base member at a small number of fixing positions while the fluttering is suppressed. As a result, the wire like transmission member is easily fixed to the base member.

(2) The wiring member of (1), in which the second wire like transmission member may be thinner than the first wire like transmission member. This allows the first wire like transmission member thicker than the second wire like transmission member to be fixed to the base member at a small number of fixing positions.

(3) The wiring member of (1) or (2), in which each of the first fixing parts may be a portion where the first wire like transmission member is welded and fixed to the base member, and each of the second fixing parts may be a portion where the second wire like transmission member is welded and fixed to the base member. In this case, the number of welding and fixing portions is reduced, and the wire like transmission member is easily fixed to the base member.

(4) The wiring member according to any one of (1) to (3), in which the plurality of first fixing parts may fix at least a part of the first wire like transmission member to the base member in a state where the at least a part of the first wire like transmission member is linearly extended, and the plurality of second fixing parts may fix at least a part of the second wire like transmission member to the base member in a state where the at least a part of the second wire like transmission member is linearly extended. Regarding the portion of the first wire like transmission member that extends linearly and is fixed to the base member, the number of fixing positions is reduced.

(5) The wiring member according to any one of (1) to (4), in which: a part of the first wire like transmission member and at least a part of the second wire like transmission member may be fixed to the base member along a common path; an other part of the first wire like transmission member may be fixed to the base member along a branch path branched from the second wire like transmission member; in the branch path, the other part of the first wire like transmission member may be fixed to the base member through the plurality of first fixing parts; and in the common path, the at least a part of the second wire like transmission member may be fixed to the base member through the second fixing parts, and further, the part of the first wire like transmission member may be fixed to the base member through a plurality of fixing parts arranged at the second interval. In the common path, the part of the first wire like transmission member and the at least a part of the second wire like transmission member are efficiently fixed to the base member at the same second interval.

(6) The wiring member according to any one of (1) to (5) may further include a third wire like transmission member that is more easily bent and deformed than the first wire like transmission member and is less easily bent and deformed than the second wire like transmission member, in which the third wire like transmission member may be fixed to the base member through at least a plurality of third fixing parts, and the plurality of third fixing parts may be arranged at a third interval smaller than the first interval and larger than the second interval in a direction along the third wire like transmission member. The fixing interval is set in finer stages according to the bending deformability of the wire like transmission member. Accordingly, the first wire like transmission member, the second wire like transmission member, and the third wire like transmission member are fixed to the base member at a small number of fixing positions as a whole while the fluttering is suppressed.

Details of Embodiments of the Present Disclosure

Specific examples of the wiring member of the present disclosure are described below with reference to the drawings. Note that the present disclosure is not limited to these examples, but is indicated by the claims, and is intended to include meanings equivalent to the claims and all modifications within the scope.

First Embodiment

Hereinafter, a wiring member according to a first embodiment is described. FIG. 1 is a schematic plan view illustrating the wiring member 20 according to the first embodiment. The wiring member 20 includes a first wire like transmission member 30, a second wire like transmission member 40, and a base member 22.

The first wire like transmission member 30 and the second wire like transmission member 40 are assumed to be wire like transmission members that connect components together in a vehicle. The first wire like transmission member 30 and the second wire like transmission member 40 extend along a wiring path corresponding to a position or the like of a component to be connected.

More specifically, the wire like transmission member may be a wire like member that transmits electricity, light, or the like. For example, the wire like transmission member may be a general electric wire having a core wire and a coating around the core wire, or may be a bare conductive wire, a shield wire, a twisted wire, an enameled wire, a nichrome wire, an optical fiber, or others.

The wire like transmission member that transmits electricity may be various signal lines or various power lines. A part or the like of the wire like transmission member that transmits electricity may be used as such as an antenna or a coil that transmits or receives a signal or power to or from a space.

The wire like transmission member may be a single wire like object or a composite of a plurality of wire like objects (a twisted wire, a cable in which a plurality of wire like objects are collected and covered with sheath, etc.).

Here, description is mainly made assuming that the first wire like transmission member 30 is the first electric wire 30 and the second wire like transmission member 40 is the second electric wire 40.

The second wire like transmission member 40 is more easily bent and deformed than the first wire like transmission member 30. For example, whether or not bending deformation is easy depends on bending rigidity. For example, the bending rigidity of the second wire like transmission member 40 is lower than the bending rigidity of the first wire like transmission member 30. The matter regarding which of the first wire like transmission member 30 and the second wire like transmission member 40 is more easily bent and deformed may be determined by, for example, performing a bending test such as a three-point bending test or a four-point bending test under a normal temperature environment and measuring a force required from a predetermined initial state (for example, a linear state) to a predetermined deformed state.

In general, because a thin wire like body is more easily bent and deformed than a thick wire like body, the second wire like transmission member 40 may be regarded as being thinner than the first wire like transmission member 30. In the present embodiment, an example in which the second electric wire 40 is thinner than the first electric wire 30 is described.

Note that in the case of, for example, the physical properties of the material itself constituting the first wire like transmission member 30 is greatly different from the physical properties of the material itself constituting the second wire like transmission member 40, the thick wire like body may be more easily bent and deformed than the thin wire like body. For example, it is assumed that the first wire like transmission member and the second wire like transmission member are electric wires. As the coating of the electric wire, polyvinyl chloride (PVC), polyethylene (PE), or the like can be used. In general, PVC is more flexible than PE. For this reason, the PVC-coated electric wire tends to be easily bent and deformed, and the PE-coated electric wire tends not to be easily bent and deformed. In this case, even when the first wire like transmission member is thinner than the second wire like transmission member, there may be a case where the second wire like transmission member is more easily bent and deformed than the first wire like transmission member.

The base member 22 is a member to which the first electric wire 30 and the second electric wire 40 are fixed. The base member 22 has a principal surface 23, and by the first electric wire 30 and the second electric wire 40 being fixed to this principal surface 23, the first electric wire 30 and the second electric wire 40 are held along a predetermined path. That is, the base member 22 can be regarded as a member having the principal surface 23 that holds the first electric wire 30 and the second electric wire 40 along the predetermined path. It is sufficient as long as the base member 22 is a member having the principal surface 23 for fixing the first electric wire 30 and the second electric wire 40 as described above, and the base member 22 may be formed in a sheet shape or may be formed in a three-dimensional shape. The principal surface 23 may be a flat surface, a curved surface, an uneven surface, or a surface in which a flat surface and another curved surface are combined.

Here, the base member 22 is described as a member having a plane flat portion, more specifically, a bendable sheet member 22.

The sheet member 22 may be formed in a shape along a wiring path between the first electric wire 30 and the second electric wire 40. Here, the sheet member 22 includes a first belt-shaped portion 24 and a second belt-shaped portion 26. The first belt-shaped portion 24 is formed in an elongated rectangular shape. The second belt-shaped portion 26 is also formed in an elongated rectangular shape. The second belt-shaped portion 26 extends from the proximal end of the first belt-shaped portion 24 in a direction orthogonal to the extending direction of the first belt-shaped portion 24. That is, the sheet member 22 has a shape in which the first belt-shaped portion 24 and the second belt-shaped portion 26 are continuous in an L shape. The sheet member may be formed linearly or may be bent in various directions. The sheet member may have a curved portion. The sheet member 22 may have a branched portion.

A material constituting the sheet member 22 is not particularly limited, but the sheet member 22 is preferably formed of material containing resin such as polyvinyl chloride (PVC), polyethylene terephthalate (PET), or polypropylene (PP). The sheet member 22 may be a sheet material in which the inside is uniformly embedded, a nonwoven sheet, or the like. The sheet member 22 may include material such as metal. The sheet member 22 preferably has flexibility to be easily bent in the thickness direction. The sheet member 22 may include a single layer or a plurality of layers that are laminated. In the case of the plurality of layers being laminated, it is conceivable that, for example, the sheet member 22 is formed by laminating a resin layer and a resin layer. More specifically, it is conceivable that, for example, the sheet member 22 is formed by laminating a resin sheet material whose inside is uniformly filled and a nonwoven sheet. Alternatively, it is conceivable that, for example, the sheet member 22 is formed by laminating a resin layer and a metal layer.

The first electric wire 30 is fixed to the sheet member 22 through a plurality of first fixing parts 36. Note that the first electric wire 30 may be fixed to the sheet member 22 through other fixing parts in addition to the plurality of first fixing parts 36. For example, at least a part of the first electric wire 30 may be fixed to the sheet member 22 through the plurality of first fixing parts 36, and the other part of the first electric wire 30 may be fixed to the sheet member 22 through the other fixing parts.

The second electric wire 40 is fixed to the sheet member 22 through a plurality of second fixing parts 46. Note that, similarly to the above, the second electric wire 40 may be fixed to the sheet member 22 through other fixing parts in addition to the plurality of second fixing parts 46.

As a mode of fixing the first electric wire 30 and the second electric wire 40 to the sheet member 22, it is sufficient that as long as the first electric wire 30 or the second electric wire 40 is fixed to the sheet member 22 at a partial position in the longitudinal direction, and the fixation may be a contact site fixation or a non-contact site fixation. Here, the contact site fixation is fixation in which a portion where the first electric wire 30 or the second electric wire 40 and the sheet member 22 are in contact with each other is adhered and fixed. Further, the non-contact site fixation is a fixation mode other than the contact site fixation. The non-contact site fixation is fixation in which, for example, a fixing member such as a sewing thread or an adhesive tape presses the first electric wire 30 or the second electric wire 40 toward the sheet member 22 to maintain the pressed state. In the following description, it is assumed that the first electric wire 30 or the second electric wire 40 and the sheet member 22 are in a state of the contact site fixation.

As a mode of the contact site fixation, a contact site indirect fixation may be used, a contact site direct fixation may be used, or both may be used in combination in different regions. Here, the contact site indirect fixation means that the first electric wire 30 or the second electric wire 40 and the sheet member 22 are indirectly adhered and fixed through an indirect fixing portion such as an adhesive, a pressure-sensitive adhesive, or a double-sided pressure-sensitive adhesive tape provided therebetween. Further, the contact site direct fixation is fixation in which a portion where the first electric wire 30 or the second electric wire 40 and the sheet member 22 are directly adhered and fixed without having an adhesive or the like interposed therebetween. In the contact site direct fixation, for example, it is conceivable that the resin contained in at least one of the first electric wire 30 or the second electric wire 40 and the sheet member 22 is melted and fixed.

When this state of contact site direct fixation is formed, it is conceivable that the resin is, for example, melted by heat or dissolved in a solvent. That is, the state of contact site direct fixation may be a state of contact site direct fixation formed by heat or a state of contact site direct fixation formed by a solvent. The state of contact site direct fixation is preferably the one formed by heat.

In this case, means for forming the state of the contact site direct fixation is not particularly limited, and known means such as welding fusion, and melting joint can be used. For example, when the state of contact site direct fixation using heat is formed by welding, various welding means such as ultrasonic welding, hot pressure welding, hot air welding, and high frequency welding can be adopted. When the state of contact site direct fixation is formed by these means, the first electric wire 30 or the second electric wire 40 and the sheet member 22 are in the state of contact site direct fixation by these means. Specifically, for example, when the state of contact site direct fixation is formed by ultrasonic welding, the first electric wire 30 or the second electric wire 40 and the sheet member 22 are in the state of contact site direct fixation by the ultrasonic welding. Here, the description is made assuming that the first fixing part 36 is a portion where the first electric wire 30 is to be welded and fixed to the sheet member 22, and the second fixing part 46 is a portion where the second electric wire 40 is to be welded and fixed to the sheet member 22. In particular, the description is made assuming that these welding and fixing portions are fixing portions formed by the ultrasonic welding. That is, the first fixing part 36 is a spot-welding portion where the resin constituting the sheet member 22 and the resin constituting the coating of the first electric wire 30 are fixed to each other by ultrasonic welding. Further, the second fixing part 46 is a spat-welding portion where the resin constituting the sheet member 22 and the resin constituting the coating of the second electric wire 40 are fixed to each other by ultrasonic welding.

The first electric wire 30 is fixed on the principal surface of the first belt-shaped portion 24 of the sheet member 22. Here, the first electric wire 30 extends linearly along the longitudinal direction of the first belt-shaped portion 24. The plurality of first fixing parts 36 fix at least a linearly extending portion of the first electric wire 30 to the sheet member 22. Here, the state of the first electric wire 30 extending linearly means that the first electric wire 30 is not bent when the principal surface 23 of the sheet member 22 is observed in plan view. The state of the first electric wire 30 extending linearly means that, more preferably, in addition to the observation state in plan view, the first electric wire 30 does not straddle other electric wires and is not bent also in the direction orthogonal to the principal surface 23. The first fixing part may fix the first electric wire in a bent state to the sheet member. A portion of the first electric wire other than the portion fixed by the first fixing part may be bent and fixed to the sheet member.

The second electric wire 40 is fixed on the principal surface of the second belt-shaped portion 26 of the sheet member 22. Here, the second electric wire 40 extends linearly along the longitudinal direction of the second belt-shaped portion 26. The plurality of second fixing parts 46 fix at least a linearly extending portion of the second electric wire 40 to the sheet member 22. Here, the state of the second electric wire 40 extending linearly may be understood in a similar manner to the case of the first electric wire 30 extending linearly. The second fixing part may fix the second electric wire in a bent state to the sheet member. A portion of the second electric wire other than the portion fixed by the second fixing part may be bent and fixed to the sheet member.

One end of the first electric wire 30 extends from a distal end of the first belt-shaped portion 24 and is connected to a connector 60. One end of the second electric wire 40 extends from the distal end of the second belt-shaped portion 26 and is connected to a connector 62. The other end of the first electric wire 30 reaches the proximal end of the second belt-shaped portion 26 from the first belt-shaped portion 24, is bent in an L shape at the proximal end of the second belt-shaped portion 26, and extends outward from the proximal end of the second belt-shaped portion 26. The other end of the second electric wire 40 extends outward from the proximal end of the second belt-shaped portion 26. The other end of the first electric wire 30 and the other end of the second electric wire 40 are connected to a connector 64. The end of each electric wire may be connected to the connector without extending out from the sheet member. In this case, the connector may be fixed to the sheet member.

In the present embodiment, only one first electric wire 30 and only one second electric wire 40 are illustrated. The wiring member 20 may include a plurality of the first electric wires 30 or a plurality of the second electric wires.

In a direction along the first electric wire 30, the plurality of first fixing parts 36 are arranged at a first interval P1. Here, the interval is a distance between the fixing parts in the direction along the electric wire, and is, for example, a distance between centers of the fixing parts. In a direction along the second electric wire 40, the plurality of second fixing parts 46 are arranged at a second interval P2. The second interval P2 is smaller than the first interval P1. The first interval P1 is set to a size that allows the first electric wire 30 to be less easily flutter from the sheet member 22 in consideration of difficulty in bending deformation of the first electric wire 30. The second interval P2 is set to a size that allows the second electric wire 40 to be less likely to flutter from the sheet member 22 in consideration of difficulty in bending deformation of the second electric wire 40. Generally, a wire like body which is easily bent and deformed bends easily between the fixing positions and thus easily flutters with respect to the fixing target. On the other hand, a wire like body which is not easily bent and deformed does not bend easily between the fixing positions and thus does not easily flutter with respect to the fixing target. Therefore, the first electric wire 30 that is not easily bent and deformed is fixed to the sheet member 22 at the first interval P1 larger than the second interval P2. Further, the second electric wire 40 that is easily bent and deformed is fixed to the sheet member 22 at the second interval P2 smaller than the first interval P1. It is sufficient that each electric wire is fixed as long as at least one first interval P1 among the fixing intervals of the first electric wire is larger than at least one second interval P2 among the fixing intervals of the second electric. For example, in consideration of the wiring space and the routing work of the wiring member and the packing style and the like at the time of transportation, a part of the fixing interval for fixing the first electric wire may be smaller equal to the second interval P2. Even in the above case, as long as at least one first interval P1 among the fixing intervals of the first electric wire is larger than at least one second interval P2 among the fixing intervals of the second electric wire, the wire like transmission member can be easily fixed to the base member.

According to the wiring member 20 configured as described above, the first electric wire 30 is fixed to the sheet member 22 through the plurality of first fixing parts 36 aligned with gaps of the first interval P1 larger than the second interval P2. Because the first electric wire 30 is less easily bent and deformed than the second electric wire 40, the first electric wire 30 does not easily flutter on the sheet member 22. Therefore, regarding the first electric wire 30, the first interval P1 can be increased within a range in which flutter can be suppressed, and the number of fixing positions can be reduced. On the other hand, the second electric wire 40 is more easily bent and deformed than the first electric wire 30. Therefore, the second electric wire 40 is fixed to the sheet member 22 through the plurality of second fixing parts 46 aligned at the second interval smaller than the first interval P1. With this configuration, the second electric wire 40 does not easily flutter on the sheet member 22. Accordingly, the wiring member 20 as a whole is fixed to the sheet member 22 at a small number of fixing positions while the fluttering of the first electric wire 30 and the second electric wire 40 is suppressed. As a result, the first electric wire 30 and the second electric wire 40 are easily fixed to the sheet member 22.

In addition, in the case where the first electric wire 30 is thicker than the second electric wire 40 and the second electric wire 40 is thinner than the first electric wire, the thick first electric wire 30 is fixed to the sheet member 22 at a small number of fixing positions, and the thin second electric wire is fixed to the sheet member 22 at a large number of fixing positions in a state where the fluttering is effectively suppressed.

In the case of the first fixing parts 36 and the second fixing parts 46 being welding and fixing portions, the number of Welding and fixing portions is reduced. Accordingly, the first electric wire 30 and the second electric wire 40 are easily fixed to the sheet member 22 with less welding work.

The fixing interval of the electric wire may be studied in consideration of the holding strength and the like with respect to the sheet member separately at the bending positions and the intersecting positions. In the case where the fixing position of the first electric wire 30 by the first fixing part 36 is a linearly extending portion and the fixing position of the second electric wire 40 by the second fixing part 46 is a linearly extending portion, the first interval P1 and the second interval P2 can be determined while additional consideration factors are eliminated as much as possible. In this case, in the portion of the first electric wire 30 that extends linearly and is fixed to the sheet member 22, the number of fixing positions is reduced.

Note that, in the case where there are a plurality of types of electric wires having different degrees of ease of bending deformation, if the plurality of types of electric wires are fixed to the base member at intervals that prevents the electric wire that is most easily deformed from fluttering, the number of fixing positions increases, and the fixing work of the electric wires becomes troublesome. In the present wiring member, each of the plurality of types of electric wires can be fixed to the base member at an interval corresponding to ease of bending deformation, and the number of fixing positions is reduced while the fluttering is suppressed as a whole.

In the wiring member, there is a case where three or more types of electric wires having different ease of bending deformation are fixed to the base member. In this case, among the three or more types of electric wires, any of these may be regarded as the first electric wire, and any of these may be regarded as the second electric wire. For example, an electric wire that is the least easily deformed among the three or more types of electric wires is regarded as the first electric wire, and an electric wire that is the most easily deformed among the three or more types of electric wires is regarded as the second electric wire. In the case where three or more types of electric wires having different ease of bending deformation are fixed to the base member, the fixing intervals of the electric wires may be classified into three or more stages. This mode is described in the following fourth embodiment.

Second Embodiment

A wiring member 120 according to a second embodiment is described. FIG. 2 is a schematic plan view illustrating the wiring member 120. In the description of the present embodiment, the same components as those described in the first embodiment are denoted by the same reference numerals, the description thereof is omitted, and differences from the first embodiment are mainly described.

In the wiring member 120, a path of a first electric wire 130 is different from the path of the first electric wire 30 in the wiring member 20.

That is, similarly to the first electric wire 30, the first electric wire 130 is less easily bent than the second electric wire 40. One end side portion of the first electric wire 130 is fixed on the principal surface of the first belt-shaped portion 24. On the first belt-shaped portion 24, the first electric wire 130 extends linearly along the longitudinal direction of the first belt-shaped portion 24. An intermediate portion of the first electric wire 130 is bent in an L shape at a portion where the first belt-shaped portion 24 and the second belt-shaped portion 26 intersect with each other. The other end side portion of the first electric wire 130 is fixed on the principal surface of the second belt-shaped portion 26. On the second belt-shaped portion 26, the first electric wire 130 extends linearly along the longitudinal direction of the second belt-shaped portion 26.

The other end side portion of the first electric wire 130 extends along a portion of the second electric wire 40 provided on the second belt-shaped portion 26. Therefore, the other end side portion which is a part of the first electric wire 130 and at least a part of the second electric wire 40 are fixed to the sheet member 22 along a common path along the longitudinal direction of the second belt-shaped portion 26.

The one end side portion which is an other part of the first electric wire 130 is fixed to the sheet member 22 along a branch path there, a path along the longitudinal direction of the first belt-shaped portion 24) branched from the second electric wire 40. Similarly to the first embodiment described above, the one end side portion of the first electric wire 130 is fixed to the sheet member 22 at the first interval P1 through the plurality of first fixing parts 36.

In the common path, similarly to the first embodiment described above, at least a part of the second electric wire 40 is fixed to the sheet member 22 at the second interval P2 through the plurality of second fixing parts 46. Further, in the common path, the other end side portion of the first electric wire 130 is fixed to the sheet member 22 through a plurality of fixing parts 136 arranged at the second interval P2. That is, in the common path, the other end side portion of the first electric wire 130 and at least a part of the second electric wire 40 are fixed to the sheet member 22 at the same second interval P2. The plurality of second fixing parts 46 and the plurality of fixing parts 136 are preferably provided not only at the same interval but also at the same positions in the direction along the common path.

According to the present modification, because the fixing interval of the first electric wire 130 and the fixing interval of the second electric wire 40 are the same second interval P2 in the common path, the fixing work thereof is facilitated. For example, in welding the other end side portion of the first electric wire 130 and the second electric wire 40, which are running in parallel with the second belt-shaped portion 26, by using a member for applying welding energy (heating mold, ultrasonic welding tip, anvil, etc.) having a width larger than the parallel width of the first electric wire 130 and the second electric wire 40, the first electric wire 130 and the second electric wire 40 can be welded simultaneously. In the above case, in the common path, the first electric wire 130 and the second electric wire 40 can be collectively and easily fixed to the sheet member 22 at the same second interval P2. It is needless to say that, regardless of the above fixing work, if the fixing intervals with respect to the plurality of electric wires are the same, the device, the setting, and the like for the fixing work are shared, and thus the fixing work becomes easy.

In the case where a plurality of types of electric wires having different degrees of ease of deformation are arranged in parallel, the plurality of types of electric wires may be fixed to the base member at an interval corresponding to the type of electric wire that is most easily deformed.

Figure 3:
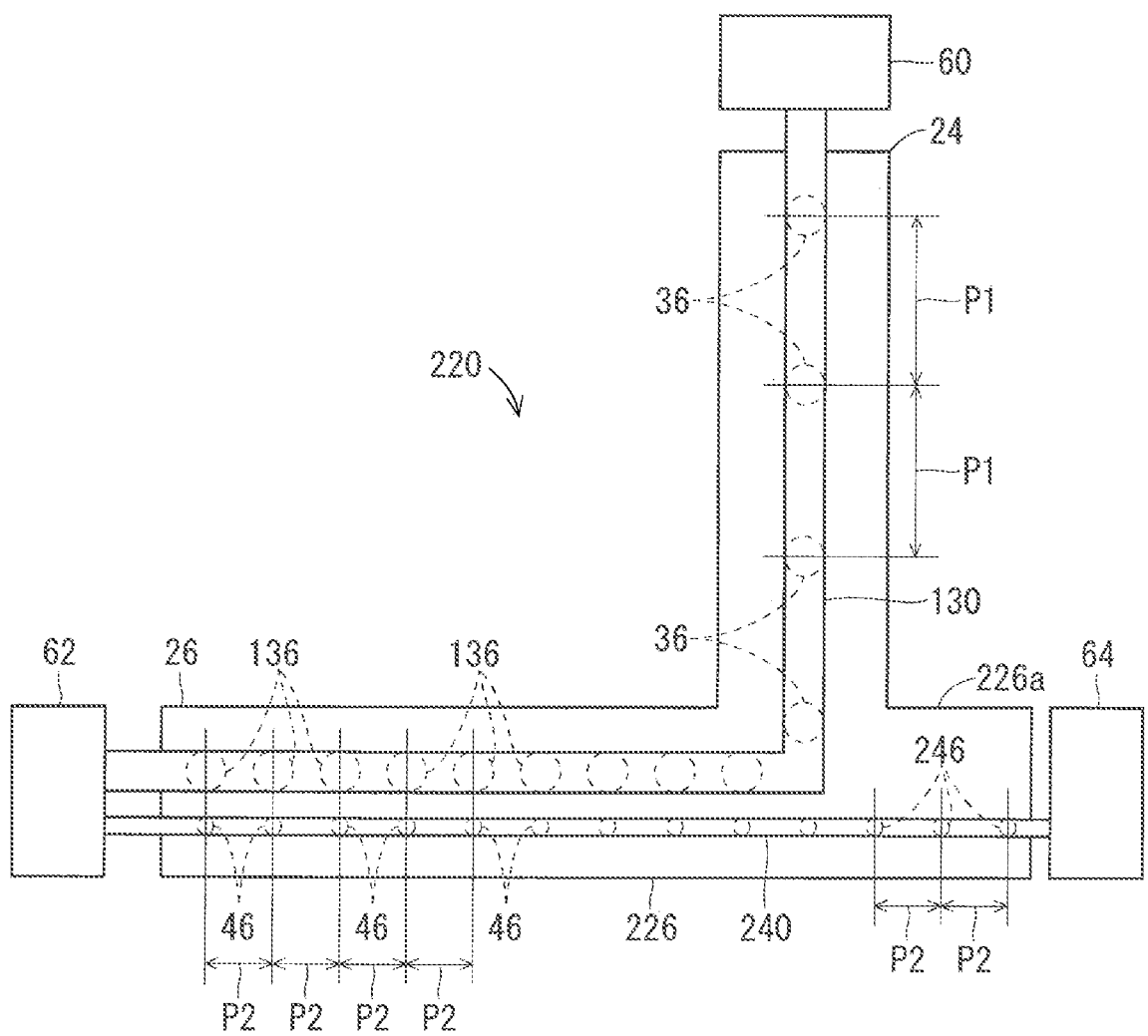
FIG. 3 is a view illustrating a wiring member according to a modification of the second embodiment.

FIG. 3 illustrates a modification according to the second embodiment. As shown in FIG. 3, in the second embodiment, a second belt-shaped portion 226 corresponding to the second belt-shaped portion 26 may have an extension portion 226a extending beyond the first belt-shaped portion 24. In addition, a second electric wire 240 corresponding to the second electric wire 40 may further extend beyond a portion where the first electric wire 130 branches therefrom. The other end of the second electric wire 240 is fixed on the extension portion 226a of the second belt-shaped portion 226. The other end of the second electric wire 240 does not share a path with the first electric wire 130, The other end of the second electric wire 240 is fixed to the extension portion 226a through a plurality of second fixing parts 246. An interval of the plurality of second fixing parts 246 is the second interval P2 described above, Therefore, the other end of the second electric wire 240 is also fixed to the extension portion 226a at an interval suitable for suppressing the fluttering.

Third Embodiment

Figure 4:
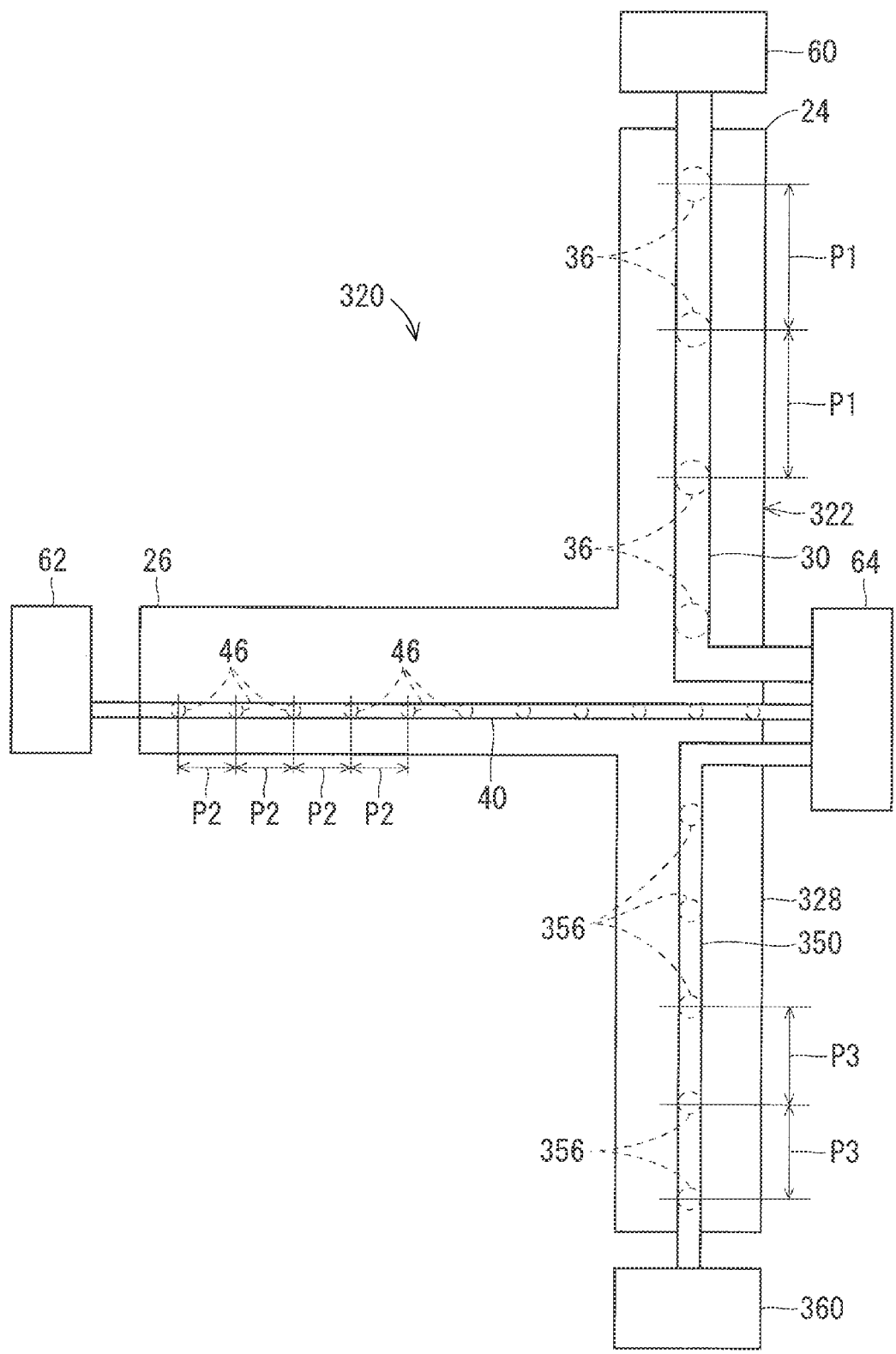
FIG. 4 is a view illustrating a wiring member according to a third embodiment.

A wiring member 320 according to a third embodiment is described. FIG. 4 is a schematic plan view illustrating the wiring member 320. In the description of the present embodiment, the same components as those described in the first embodiment are denoted by the same reference numerals, the description thereof is omitted, and differences from the first embodiment are mainly described.

In the wiring member 320, a sheet member 322 corresponding to the sheet member 22 includes a third belt-shaped portion 328. The third belt-shaped portion 328 is formed in an elongated belt shape. The third belt-shaped portion 328 intersects the proximal end of the second belt-shaped portion 26 in a direction orthogonal to the extending direction of the second belt-shaped portion 26 and extends to the opposite side of the first belt-shaped portion 24, That is, the sheet member 322 has a shape in which the first belt-shaped portion 24, the second belt-shaped portion 26, and the third belt-shaped portion 328 are continuous in a T shape. The sheet member may have other bent portions or branching portions.

The wiring member 320 includes a third wire like transmission member 350. Similarly to the wire like transmission member described in the first embodiment, the third wire like transmission member 350 may be a wire like member that transmits electricity, light, or the like. Here, it is described that the third wire like transmission member 350 is a third electric wire 350.

The third electric wire 350 is more easily bent and deformed than the first electric wire 30 and is less easily bent and deformed than the second electric wire 40. For example, the third electric wire 350 is thinner than the first electric wire 30 and thicker than the second electric wire 40.

At least a part of the third electric wire 350 is fixed to the sheet member 322 through a plurality of third fixing parts 356. One end of the third electric wire 350 extends from the distal end of the third belt-shaped portion 328 and is connected to a connector 360. The other end of the third electric wire 350 reaches the proximal end of the second belt-shaped portion 26 from the third belt-shaped portion 328, is bent in an L shape at the proximal end of the second belt-shaped portion 26, and extends outward from the proximal end of the second belt-shaped portion 26. The other end of the third electric wire 350 of the third electric wire 350 is connected to the connector 64. The third electric wire 350 extends linearly along the longitudinal direction of the third belt-shaped portion 328.

In the present embodiment, only one third electric wire 350 is illustrated. The wiring member 320 may include a plurality of the third electric wires 350.

In a direction along the third electric wire 350, the plurality of third fixing parts 356 are arranged at a third interval P3. The third interval P3 is smaller than the first interval P1 and larger than the second interval P2. Because the third electric wire 350 is more easily deformed than the first electric wire 30, the third electric wire 350 flutters more easily than the first electric wire 30. Therefore, the third electric wire 350 is fixed to the sheet member 322 at the third interval P3 smaller than the first interval P1 suitable for the first electric wire 30. Because the third electric wire 350 is less easily deformed than the second electric wire 40, the third electric wire 350 flutters less easily than the second electric wire 40. Therefore, the third electric wire 350 is fixed to the sheet member 322 at the third interval larger than the second interval P2 suitable for the second electric wire 40.

According to the present embodiment, the fixing interval is set by being finely classified into three or more stages according to the bending deformability of the electric wires 30, 40, and 350. As a result, when there are three or more types of degrees of ease of bending deformation, the number of fixing positions of the wiring member 320 as a whole is reduced while the fluttering of the first electric wire 30, the second electric wire 40, and the third electric wire 350 is suppressed. As a result, the first electric wire 30, the second electric wire 40, and the third electric wire 350 are easily fixed to the sheet member 322.

[Modification]

Note that the configurations described in the above embodiments and modifications can be appropriately combined as long as they do not contradict each other. For example, as described in the second embodiment, a configuration in which the wire like transmission members having different ease of bending deformation are arranged along the common path and a configuration in which the wiring member includes three or more types of wire like transmission members having different ease of bending deformation may be combined.

EXPLANATION OF REFERENCE SIGNS

20: wiring member
22: sheet member (base member)
23: principal surface
24: first belt-shaped portion
26: second belt-shaped portion
30: first electric wire (first wire like transmission member)
36: first fixing part
40: second wire like transmission member (second electric wire)
46: second fixing part
60: connector
62: connector
64: connector
120: wiring member
130: first electric wire
136: fixing part
220: sheet member
226: second belt-shaped portion
226a: extension portion
240: second electric wire
246: second fixing part
320: wiring member
322: sheet member
328: third belt-shaped portion
350: third electric wire (third wire like transmission member)
356: third fixing part
360: connector
P1: first interval
P2: second interval
P3: third interval

The invention claimed is:

1. A wiring member comprising:
a first wire like transmission member;
a second wire like transmission member that is more easily bent and deformed than said first wire like transmission member; and
a base member to which said first wire like transmission member and said second wire like transmission member are fixed, wherein
said first wire like transmission member is fixed to said base member through a plurality of first fixing parts,
said second wire like transmission member is fixed to said base member through a plurality of second fixing parts,
said plurality of first fixing parts are aligned at a first interval in a direction along said first wire like transmission member,
said plurality of second fixing parts are aligned at a second interval smaller than said first interval in a direction along said second wire like transmission member,
a part of said first wire like transmission member and said second wire like transmission member are fixed to said base member along a common path,
an other part of said first wire like transmission member is fixed to said base member along a branch path, branched separately from said second wire like transmission member,
in said branch path, said other part of said first wire like transmission member is fixed to said base member through said plurality of first fixing parts,
in said common path, said second wire like transmission member is fixed to said base member through said second fixing parts at said second interval, said part of said first wire like transmission member is fixed to said base member through a plurality of fixing parts arranged at said second interval, and
an endmost portion of said part of said first wire like transmission member and an endmost portion of said second wire like transmission member extending along said common path connect to a same connector.

2. The wiring member according to claim 1, wherein said second wire like transmission member is thinner than said first wire like transmission member.

3. The wiring member according to claim 1, wherein each of said first fixing parts is a portion where said first wire like transmission member is welded and fixed to said base member, and
each of said second fixing parts is a portion where said second wire like transmission member is welded and fixed to said base member.

4. The wiring member according to claim 1, wherein said plurality of first fixing parts fix at least a part of said first wire like transmission member to said base member in a state where the at least a part of said first wire like transmission member is linearly extended, and
said plurality of second fixing parts fix at least a part of said second wire like transmission member to said base member in a state where the at least a part of said second wire like transmission member is linearly extended.

* * * * *